United States Patent [19]

McKee et al.

[11] 4,229,992
[45] Oct. 28, 1980

[54] MIRROR ACTUATOR

[76] Inventors: Clyde M. McKee, 22175 Bernard, Taylor, Mich. 48180; Ward Scott, 429 Rochdale Dr., Rochester, Mich. 48063

[21] Appl. No.: 920,113

[22] Filed: Jun. 28, 1978

Related U.S. Application Data

[63] Continuation-in-part of Ser. No. 706,448, Jul. 19, 1976, abandoned, which is a continuation-in-part of Ser. No. 526,794, Nov. 25, 1974, Pat. No. 3,969,982.

[51] Int. Cl.² ............................................. F16C 1/10
[52] U.S. Cl. ................................. 74/501 M; 248/279; 248/70
[58] Field of Search .................. 74/501 M; 350/304; 248/70, 229, 274, 286, 279

[56] References Cited

U.S. PATENT DOCUMENTS

| | | | |
|---|---|---|---|
| 1,780,308 | 11/1930 | Morris | 248/229 X |
| 2,330,444 | 9/1943 | Park | 350/304 |
| 2,351,858 | 6/1944 | Ingalls | 248/229 |
| 2,465,183 | 3/1949 | Allen | 74/501 X |
| 2,541,434 | 2/1951 | Nelson et al. | 248/274 |
| 2,876,027 | 3/1959 | Sulmonetti | 248/229 X |
| 2,914,829 | 12/1959 | Willemain | 248/229 X |
| 3,261,226 | 7/1966 | Dent | 74/501 M |
| 3,429,197 | 2/1969 | Loewenstern | 75/502 |
| 3,484,066 | 12/1969 | Aunspaugh | 248/229 X |
| 3,969,952 | 7/1976 | McKee et al. | 74/501 M |

Primary Examiner—Samuel Scott
Assistant Examiner—G. Anderson
Attorney, Agent, or Firm—Gifford, VanOphem, Sheridan & Sprinkle

[57] ABSTRACT

An assembly for converting mirrors commonly provided on trucks so that the mirror can be adjusted from a position adjacent the seat of the driver to provide maximum visibility from the right hand mirror. A clamp mounts to the mirror and connects to an actuator positioned in the truck adjacent the seat of the driver so that the mirror may be adjusted by the driver while the driver remains in the driving position.

3 Claims, 4 Drawing Figures

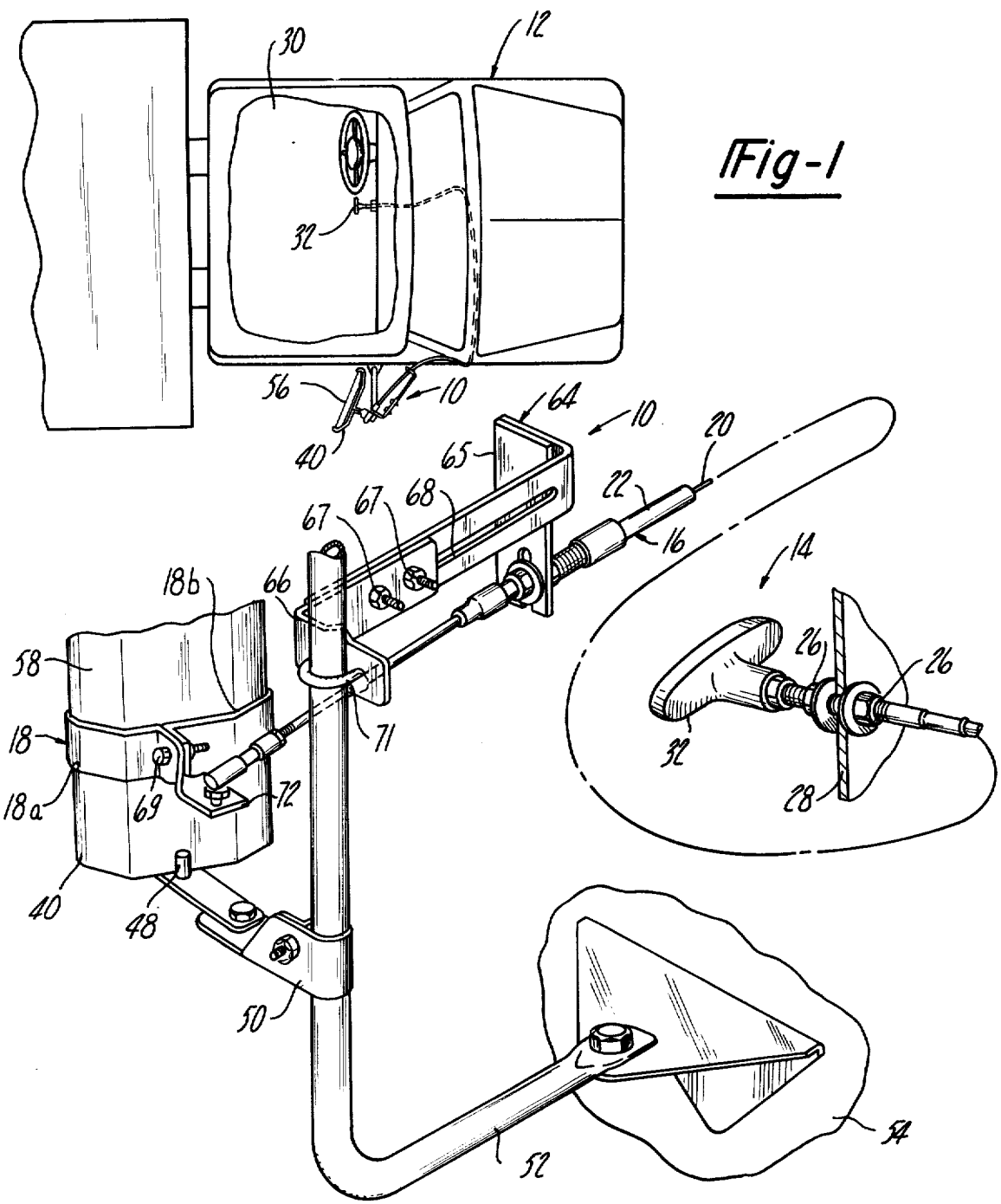

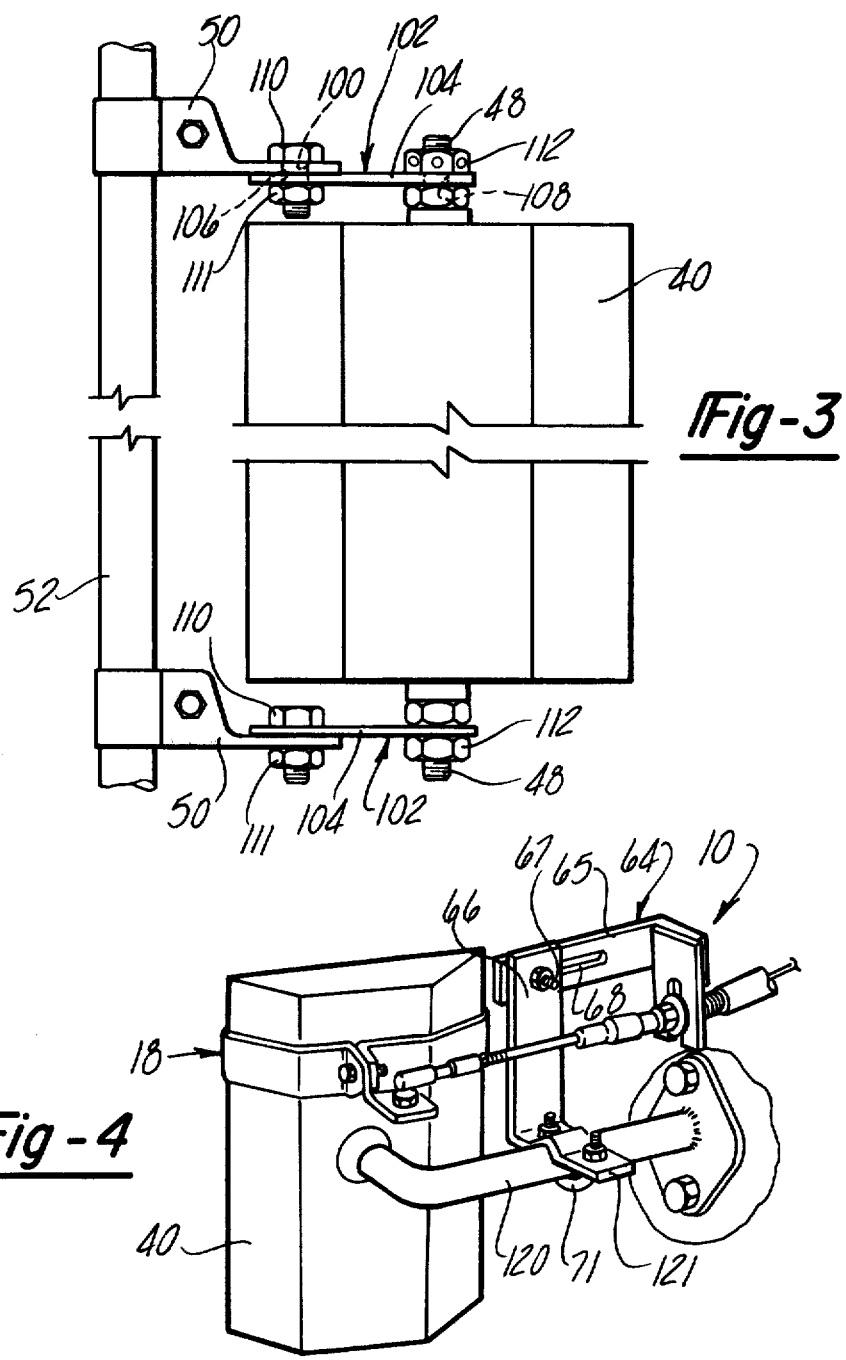

MIRROR ACTUATOR

RELATIONSHIP TO OTHER APPLICATIONS

The present application is a continuation-in-part application of Ser. No. 706,448 filed July 19, 1976 now abandoned, which in turn is a continuation-in-part application of Ser. No. 526,794 filed Nov. 25, 1974 now U.S. Pat. No. 3,969,982.

BACKGROUND OF THE INVENTION

I. Field of the Invention

The present invention relates to right hand, exteriorly mounted rear view mirrors for trucks and, more particularly, to an assembly adapted to be attached to such mirrors already mounted to a truck to permit the right hand mirror to be adjusted from the driving position to provide maximum visibility.

II. Description of the Prior Art

Modern day trucks, and particularly truck trailer combinations, are typically provided with externally mounted left hand and right hand rear view mirrors. The combination of the left hand and right hand rear view mirrors provide adequate rear view vision for the driver during many operating conditions such as, for example, highway cruising. The conventional previously known external mirrors for a truck are typically rigidly mounted to the truck by struts extending from the truck with the mirrors individually pivotally mounted to the struts. Thus, for different drivers, the mirrors often must be adjusted prior to the use of the truck.

Although such conventional exterior mirrors have proven sufficient for highway driving, they have been found to be inadequate when backing up the truck, particularly when the rear of the trailer is being moved to the right while the truck is backing up. During such a maneuver, the truck is skewed relative to the trailer and because of this the driver in his normal operating position receives only a view of the side of his trailer from his right hand exterior mirror. In order to compensate for this totally inadequate rear view right hand view, truck drivers have heretofore been known to adjust their driving position, crane their necks, and the like in order to obtain an adequate view of the rear of the trailer. Needless to say, such actions and movements by truck drivers are not only difficult for the truck drivers but also distract the truck drivers, thus creating a safety hazard.

There have, however, been a number of previously known mirror actuator assemblies for converting a stationary exterior mirror to a mirror adjustable from the interior of the vehicle. Such mirror assemblies, however, suffer from a number of common disadvantages and thus have not enjoyed widespread acceptance or use.

One such disadvantage of the previously known mirror assemblies is that the mirror is initially rigidly attached to support struts by mirror clamps. Conventionally, each mirror clamp comprises a brace having an aperture through which a threaded pin attached to the mirror extends. A nut threadably engages the pin so that, upon tightening, the mirror is secured in position on the clamps and locked against rotation. If the nuts are left "loose," they soon undesirably further loosen due to vibration from the vehicle.

A still further disadvantage of these previously known mirror assemblies is that such mirror assemblies were not readily adaptable to a wide variety of different types of mirrors. For example, some prior known mirror assemblies could only be connected to mirrors having vertically extending support struts while others could only be connected to a horizontally extending mirror strut. These previously known mirror assemblies also lacked a simple, yet effective, means whereby the initial, unadjusted position of the mirror could be preset.

SUMMARY OF THE INVENTION

The present invention eliminates the above mentioned disadvantages of the previously known truck rear view mirrors and mirror assemblies by providing an assembly adapted to be mounted to a conventional exteriorly mounted right hand rear view mirror to provide adjustment for the right hand mirror from the driving position.

A clamp is provided to be mounted to the mirror and is connected to a cable assembly which extends into the cab of the truck. A knob is connected to the inner end of the cable and is mounted inside the truck at a position adjacent the truck driver so that the driver may actuate the knob from his normal driving position. The clamp and cable are mounted so that actuation of the knob produces pivoting, adjusting movement of the mirror. Thus, as will be more fully hereinafter explained, the driver will be able to obtain an adequate rear view from the right hand mirror by the appropriate adjustment of the mirror while backing up the truck.

The present invention is advantageous over the previously known mirror assemblies in that it can be easily adapted for connection to either the horizontal or vertical support strut of a preexisting stationary mirror. Moreover, an unexpensive, but effective, bracket extension enables the mirror to pivot while a bracket assembly permits rapid initial angular adjustment of the mirror.

BRIEF DESCRIPTION OF THE DRAWING

The mirror actuator assembly of the present invention will be more clearly understood by reference to the following detailed description when read in conjunction with the attached drawing, wherein like reference characters refer to like parts throughout the several views, and in which:

FIG. 1 is a top plan view showing the mirror actuator of the present invention installed in a truck;

FIG. 2 is a perspective view of the mirror actuator of the present invention;

FIG. 3 is a side plan view illustrating a portion of the mirror actuator of the present invention; and FIG. 4 is a perspective view similar to FIG. 2, but showing a modification thereof.

DETAILED DESCRIPTION OF THE PRESENT INVENTION

The mirror actuator assembly of the present invention, generally denoted by the number 10, is illustrated in FIG. 1 as installed on a truck 12. The mirror actuator assembly 10 generally comprises three components, namely, a knob 14, a cable assembly 16 and a clamp assebmly 18.

The cable assembly 16 is of the conventional type, having an inner wire member 20 and an outer sleeve 22 so that the inner wire member 20 may slide axially relative to the sleeve 22. At the end disposed within the truck 12, the outer sleeve 22 is threaded as at 24 (FIG.

2) to permit nut members 26 to lock the outer sleeve 22 to the dashboard 28 of the truck 12 preferably adjacent the seat 30 (FIG. 1) of the driver. In this manner, the outer sleeve 22 of the cable assembly 16 is rigidly secured to the dashboard 28. The knob 14 is attached to the end of the inner wire member 20 within the truck 12 so that pulling and pushing the knob 14 produces axial movement of the inner wire member 20 within the outer member 22.

As can best be seen in FIGS. 2 and 3, a mirror 40 of the type conventionally provided on trucks is thereshown which includes a pair of threaded pins 48 extending outwardly at the top and bottom. The pins 48 initially extend through apertures 100 in a pair of vertically spaced brackets 50 and are secured to the brackets by conventional nuts. The brackets 50 in turn are secured by a strut 52, or the like, to the door panel 54 (FIG. 2) of the truck 12.

The present invention, however, provides a pair of bracket extensions 102, each comprising a flat metal bar 104 having holes 106 and 108 formed through opposite ends of the bar 104. A bolt 110 and nut 111 secure one end of the bar 104 to the bracket 50 while the mirror pin 48 is pivotally positioned in the outer hole 108 of the bracket extension 102. A lock nut 112 is then threadably secured to the mirror pin 48 and tightened sufficiently to prevent the mirror 40 to pivot. The bracket extensions 102 also serve to space the mirror 40 away from the strut 52 to prevent interference between the clamp assembly 18 and the strut 52.

It will be appreciated that the mirror 40 typically comprises a rear reflective portion 56 (FIG. 1) and a forward metal housing 58 in which the reflective portion 56 is mounted.

The cable assembly 16 extends through an aperture (not shown) formed in the door panel 54. The outer sleeve member 22 of the cable 16 is secured to the strut 52 by a bracket assembly 64. The bracket assembly 64 is of a two piece construction comprising members 65 and 66 longitudinally, adjustably fastened together by fasteners 67 which enter through an elongated slot 68 provided in the bracket member 65. The bracket member 66 is mounted to the strut 52 by a bolt 71. The adjustment provided by the slot 68 permits the distance between the end of inner wire member 20 and the outer sleeve 22 to be adjusted to thereby accommodate mirrors of different sizes and configurations and to also adjust the initial pivotal position of the mirror 40.

The clamp assembly 18 comprises a pair of members 18a and 18b each having an outer lip adapted to engage the edge of the mirror 40 and to be drawn together by a fastener 69. The clamp 18 also includes an outwardly extended portion 72 which receives the threaded end of the inner wire member 20 of the cable assembly 16. It can thus be seen that the position of the clamp 18, and hence the rotational position of the mirror 40, is controlled by the axial position of the wire member 20 relative to the sleeve 22 of the cable assembly 16. It will also be appreciated that any conventional means may be used to secure the inner wire member 20 of the cable assembly 16 to the clamp 18 without deviating from the spirit of the invention.

The operation of the mirror actuator of the present invention will now be described with particular reference to FIG. 1. With the knob 14 in a slightly extended position, the mirror 40 assumes a central position. As the knob 14 is moved to an extreme extended position, the inner wire member 20 will be moved axially inwardly relative to the sleeve 32 to rotate the mirror 40 counterclockwise. Conversely, when the knob 14 is pushed in toward the dash board 28 inner wire member 20 extends relative to the sleeve 22 and rotates the mirror 40 in the clockwise direction around the pivot 48.

The clamp 18 will fit substantially all mirrors presently in use and the bracket 64 provides a wide range of adjustability so that the assembly of the present invention can be used with a great number of different mirrors and trucks.

With reference now to FIG. 4, a modified installation of the mirror actuator 10 of the present invention is thereshown in which the bracket assembly 64 is connected to a horizontally extending mirror strut 120. To accomplish this, the bracket member 66 is rotated 90° with respect to the bracket member 65 and is secured at its free end 121 to the horizontal mirror strut 120 by the U-bolt 71. In this case, however, only one bolt 67 secures the first and second bracket members 65 and 66 together but longitudinal adjustment of the first member 65 is still possible by adjusting the position of the bolt 67 in the first member slot 68. It can thus be seen that, unlike the previously known mirror actuators, the device 10 according to the present invention can easily and readily accommodate different types of mirrors without loss of any adjustment capability.

Thus it can be seen that the assembly of the present invention will accommodate mirrors of many different sizes and configurations and can be readily installed on trucks already having mirrors without the necessity of removing or in any way altering the mirrors. This substantially reduces the cost of providing such a system for a truck since the most expensive item, the mirror, is already a part of the truck.

Once installed the rotational position of the mirror 40 may be readily adjusted by the knob 14 to provide the desired rear view for the driver from the right hand exterior mirror. Unlike previously known exteriorly mounted right hand truck mirrors, the mirror actuator assembly 10 of the present invention may be simply and easily adjusted by moving the knob 14 and without the necessity of the driver shifting from his normal driving position. The present invention thus provides maximum rear view visibility with a minimum of effort from the driver and also eliminates the previously mentioned safety hazard caused by drivers shifting from their driving position in an attempt to obtain rear view visibility.

Having thus described our invention, many modifications thereto will become apparent to those skilled in the art without deviating from the spirit of the invention as defined by the scope of the appended claims.

We claim:

1. A mirror actuator assembly adapted for use in conjunction with an exteriorly mounted conventional right hand mirror already mounted on a vehicle by at least one strut, said mirror being pivotally mounted around a generally vertical axis of rotation, said assembly comprising:
   a cable assembly having an outer sleeve portion and an inner wire member;
   one end of said inner wire member extending into said vehicle and including means attached thereto for selectively moving said inner wire member axially within said outer member;
   means removably attaching the opposite end of said inner wire member to said mirror to produce rotation of said mirror around said vertical axis upon axial movement of said inner wire member along an axis of movement; and a bracket assembly having a first elongated bracket member and a second elongated bracket member, means for securing one end of said first bracket member to the strut, means for securing one end of the second bracket member to the outer sleeve portion of the cable assembly at a predetermined longitudinal position along the outer sleeve portion and means for longitudinally adjustably securing said second bracket member to the other end of said first bracket member, said longitudinal adjustable securing means further comprising an elongated slot formed through said second bracket member, an aperture formed through said other end of the first bracket member and fastener means which extends through said slot and said aperture for locking said bracket members together at an adjusted position, whereby with the inner wire member stationary with respect to the outer sleeve portion the angular position of the mirror can be varied by adjusting the longitudinal position of the second bracket member and wherein said longitudinal adjustable securing means further includes means for securing said bracket members together in a selected pivotal position with respect to each other whereby said one end of the first bracket member can be selectively secured to either a vertical or horizontal strut and wherein said elongated slot in said second bracket member extends substantially parallel to said axis of movement when said first bracket member is connected to either a vertical or a horizontal strut.

2. The invention as defined in claim 1 wherein said fastening means further comprises a bolt and a nut which threadably engages the bolt.

3. The invention as defined in claim 1 wherein said mirror includes a thread pin which is normally secured to a strut bracket by a nut, said mirror actuator assembly further comprising an elongated bracket extension secured at one end to the strut bracket, said extension having an aperture at its other end through which the mirror pin is pivotally received, and a lock nut secured to the mirror pin sufficiently tight to prevent vibration of the mirror and yet permit rotation of the mirror.

* * * * *